(12) United States Patent
Tripmaker

(10) Patent No.: US 7,151,985 B2
(45) Date of Patent: Dec. 19, 2006

(54) SYSTEM AND METHOD FOR EXCHANGING PROGRAMS IN AIRCRAFT COMPUTERS

(75) Inventor: Helmut Tripmaker, Himmelpforten (DE)

(73) Assignee: Airbus Deutschland GmbH, Hamburg (DE)

( * ) Notice: Subject to any disclaimer, the term of this patent is extended or adjusted under 35 U.S.C. 154(b) by 176 days.

(21) Appl. No.: 10/917,832

(22) Filed: Aug. 13, 2004

(65) Prior Publication Data

US 2005/0065670 A1    Mar. 24, 2005

(30) Foreign Application Priority Data

Aug. 13, 2003  (DE)  ................................. 103 37 171

(51) Int. Cl.
*G06F 9/445* (2006.01)

(52) U.S. Cl. ............................................. 701/3; 701/33

(58) Field of Classification Search ...................... None
See application file for complete search history.

(56) References Cited

U.S. PATENT DOCUMENTS

| | | | |
|---|---|---|---|
| 6,026,366 A | 2/2000 | Grube | |
| 6,266,736 B1 * | 7/2001 | Atkinson et al. | 711/103 |
| 6,438,468 B1 * | 8/2002 | Muxlow et al. | 701/3 |
| 6,671,589 B1 * | 12/2003 | Holst et al. | 701/3 |
| 2002/0111720 A1 * | 8/2002 | Holst et al. | 701/3 |
| 2003/0003872 A1 * | 1/2003 | Brinkley et al. | 455/66 |
| 2003/0069015 A1 * | 4/2003 | Brinkley et al. | 455/431 |

FOREIGN PATENT DOCUMENTS

| | | |
|---|---|---|
| EP | 0 774 724 | 5/1997 |
| WO | WO 02/065683 | 8/2002 |

\* cited by examiner

*Primary Examiner*—Michael J. Zanelli
(74) *Attorney, Agent, or Firm*—W. F. Fasse; W. G. Fasse

(57) ABSTRACT

In an aircraft, individual computers are connected by a data bus to a central controller system. To reprogram, i.e. load a new program into, any one of the computers, each computer is equipped with a radio interface module and a radio antenna to establish a radio link with a central computer unit that provides and transmits the new program via the radio link at a high data transfer rate, e.g. above 200 kByte per second. The relatively slow physical data bus is not used for transmitting or loading the new program. Each computer has a base system program loaded and executed therein, to control, monitor or otherwise support the process of loading the new program, and to test the new program once it has been loaded.

19 Claims, 1 Drawing Sheet

SYSTEM AND METHOD FOR EXCHANGING PROGRAMS IN AIRCRAFT COMPUTERS

PRIORITY CLAIM

This application is based on and claims the priority under 35 U.S.C. §119 of German Patent Application 103 37 171.0, filed on Aug. 13, 2003, the entire disclosure of which is incorporated herein by reference.

FIELD OF THE INVENTION

The invention relates to a system as well as a method for exchanging programs in aircraft computers, i.e. for programming or reprogramming computers in aircraft that are preferably connected via a data bus to a central aircraft system such as a central controller system.

BACKGROUND INFORMATION

Modern passenger transport aircraft typically include plural aircraft computers connected to each other via an aircraft data bus. Thereby, the computers may be individually installed at separate locations distributed throughout the aircraft, often at inaccessible or difficult-to-access locations.

Over the course of the operating life of the aircraft, it becomes necessary to exchange programs in the aircraft computers, i.e. to reprogram or newly program a given aircraft computer with a different software program. This may involve loading merely updated or improved versions of a previous computer program, or loading an entirely new or substantially different program to be executed in the respective aircraft computer. In any event, this requires loading a new software program to replace the previous program in the respective aircraft computer.

One known method for exchanging computer programs in aircraft computers in the context as described above involves physically exchanging memory components in which the respective programs are stored. To achieve this, each respective aircraft computer is uninstalled and removed physically from the aircraft and brought to a workshop, where the respective pertinent memory component (which may be any known type of program storage component) is physically removed from the computer. Then, a new memory component, in which the new program has been loaded, is physically installed into the computer. Thereafter, the computer itself (including the new memory component with the new program) must be reinstalled in the aircraft. Such a method of reprogramming or exchanging programs in aircraft computers is extremely complicated, time consuming, and costly.

Another known method of reprogramming or exchanging programs in aircraft computers allows the computers to remain physically installed at their existing installation locations, but instead loads the new programs via the existing aircraft data bus or data buses. Unfortunately, the data transfer or throughput rate of conventional aircraft data buses is quite low, so that the loading of new programs via the aircraft data bus is very time consuming and generally bothersome and not satisfactory.

SUMMARY OF THE INVENTION

In view of the above, it is an object of the invention to provide a system as well as a method for exchanging programs or loading new programs into aircraft computers, while avoiding the need to physically remove or uninstall the computers, avoiding the need to physically swap hardware memory components, and also achieving a more-rapid data transfer rate for carrying out the loading or exchanging of programs, for example a data transfer rate over 200 kByte per second. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an aircraft-based computer system adapted to enable loading a program into an aircraft computer. The computer system comprises a plurality of individual aircraft computers that are preferably located separately and distributed relative to each other, and that are connected via an aircraft data bus to a central aircraft system such as a central controller system of an aircraft. The inventive system or arrangement further includes a central computer or processor unit that has a new program loaded, developed or prepared therein or that is otherwise adapted to provide a new program. The central computer unit is connected via a radio link to each one of the individual aircraft computers. In this regard, the central computer unit as well as each individual aircraft computer is equipped with a radio transmitting and/or receiving antenna. In this system, the loading of the new program from the central computer unit to a respective one of the aircraft computers is carried out via the radio link, whereby data transfer rates of over 200 kByte per second can be achieved.

Preferably in the inventive system, each individual aircraft computer includes a previously loaded base system program that is executed in the respective aircraft computer to carry out, support or monitor the process of loading the new program from the central computer unit to the respective aircraft computer, and that is adapted to test the loaded new program. Each aircraft computer further includes a release switch, an intermediate memory or storage, and a test switch connected in series with one another between a radio interface module and the main computer program (e.g. stored in a main active memory for executable programs) of the respective aircraft computer. The radio interface module is connected to the radio antenna of this aircraft computer to receive the new program being radio transmitted from the central computer unit. The base system program of the aircraft computer controls the release switch so that the respective aircraft computer is available and released to receive a new program via the radio link from the central computer unit only when this aircraft computer is not operating, i.e. executing its normal computer program. The test approval switch (or simply "test switch") is also controlled by the base system program so as to be closed or enabled only after the new program has been loaded from the central computer unit via the radio link through the radio interface module and the release switch into the intermediate memory, and has there been tested by the base system program to validate the new program (e.g. to exclude transmission errors). Then the new program may be loaded via the test switch into the active program memory of the respective aircraft computer to be executed with or instead of the main computer program of the respective aircraft computer.

The above objects have further been achieved according to the invention in a method of loading a new program into a respective aircraft computer comprising the following steps. A new program is prepared, stored or otherwise provided in a central computer or processor unit. The new program is radio transmitted via a radio link from the central computer unit to the respective aircraft computer. A base system program running in the respective aircraft computer carries out, controls, regulates, monitors or otherwise supports the loading process in which the new program is radio transmitted via the radio link from the central computer unit to the respective aircraft computer, and there is loaded into a main active memory for execution. Furthermore, the base system program tests the new program that has been loaded into the aircraft computer.

According to a preferred special embodiment or further feature of the inventive method, the respective aircraft computer is made ready or released for receiving the new program via the radio link only when this respective aircraft computer is not in a normal operating mode, i.e. not running or executing its normal computer program. Furthermore, after a new program is loaded into an intermediate memory of the respective aircraft computer, the new program is finally provided to the active memory for execution only after the new program has been successfully tested and validated as error-free, for example by the base system program of the aircraft computer. In this regard, the testing of the loaded new program can be carried out respectively by and in the individual aircraft computer, or can be carried out by and from the central aircraft system such as the central controller system.

A further preferred feature of the invention is that the radio link between the central computer unit and the individual aircraft computers is carried out at a radio frequency, i.e. the central computer unit and the aircraft computer communicate with one another at a given radio frequency or frequency range, that is not otherwise utilized for radio transmissions in the normal flight operation of the aircraft. This avoids any impermissible radio interference with other systems of the aircraft using radio communications or data exchanges by means of radio transmissions. Furthermore, each individual aircraft computer of a plurality of available aircraft computers is individually identified by a respective unambiguous address, so that each individual aircraft computer can be respectively addressed via the radio link to carry out the radio transmission to this particular selected aircraft computer without acting on the other non-selected aircraft computers.

According to another preferred feature of the invention, the radio interface module and the radio antenna are combined or integrated with one another to form a communications unit, that can be embodied as a fixed component of each respective aircraft computer or can be embodied as a separable portable module that is retrofitted or temporarily connected to the respective aircraft computer via a plug connection.

A substantial advantage of the invention is that, for typical program sizes, the aircraft computers can be reprogrammed within just a few seconds, especially without having to uninstall and remove the computers from their operationally required installation locations. The central computer or processor unit that provides the new program to be loaded into the individual distributed aircraft computers can be installed in the aircraft, e.g. as a central programming computer, or it can be a portable computer, such as a laptop or notebook computer, that is simply brought into the aircraft or into the radio link proximity of the aircraft for carrying out the new program loading process. The portable computer does not have to be certified under the usual aircraft certification regulations, because it is not used for and will not interfere with flight operation functions.

With the inventive system and method, even aircraft computers installed at difficult-to-access or inaccessible locations within the aircraft can be easily and freely reprogrammed, whereby the system environment of the aircraft system remains completely uninfluenced by the reprogramming.

It is also advantageous that the radio link between the central computer unit and the individual aircraft computers is realized with typical commercially available radio transmission and/or reception components or elements. Furthermore, these elements do not need to be qualified under special aircraft certification regulations, because they are not involved in critical aircraft operating processes. This achieves a considerable cost savings. Since the inventive radio link cannot be used during the normal operation of the respective aircraft computer, due to the control by means of the release switch, it is also ensured that no negative influences will arise on the behavior of the aircraft system such as the aircraft central controller system.

Since the inventive method and apparatus or system do not require a physical or hard-wired connection of the central computer unit to the aircraft data bus and/or to the individual aircraft computers, the central computer unit (especially as a portable computer unit) can also be used for carrying out maintenance functions on the ground, whereby the radio link is also utilized. For example, the central computer unit and the radio link can be used on the ground for reading-out memory contents and/or error inquiries.

BRIEF DESCRIPTION OF THE DRAWINGS

In order that the invention may be clearly understood, it will now be described in detail in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
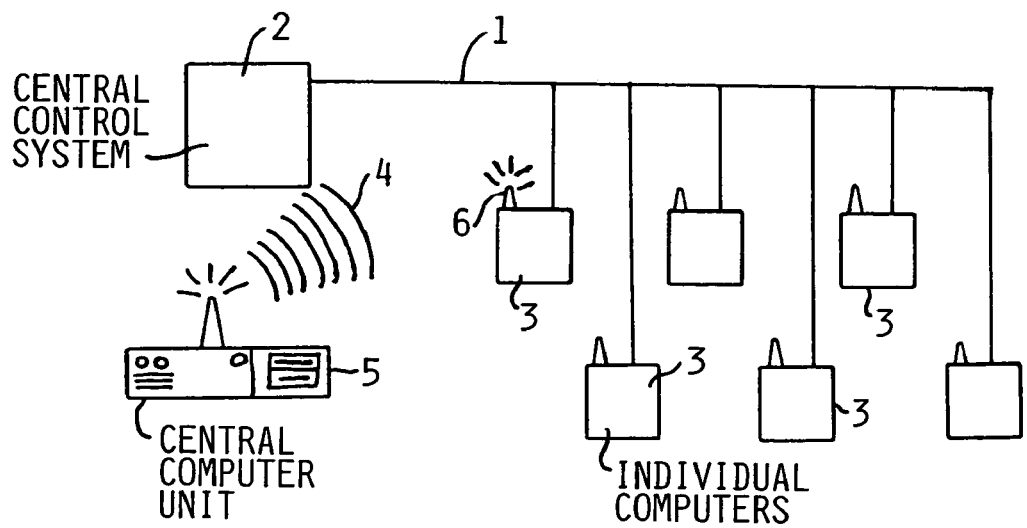
FIG. 1 is a schematic diagram of plural individual aircraft computers connected to an aircraft data bus and connected via a radio link to a central computer or processor unit, making up a system according to the invention.

The inventive system schematically shown in FIG. 1 includes a plurality of individual aircraft computers 3 that are each connected to a hard-wired aircraft data bus 1, such as a data bus of electrical or optical conductors, as well as a central aircraft system such as a central controller system 2 that is also connected to the data bus 1. The central controller system 2 is adapted to receive and transmit data from and to the data bus 1 as well as from and to external inputs and outputs connected to other electronic systems or components of the aircraft. Thus, the central aircraft system or controller system 2 communicates with the individual aircraft computers 3 via the data bus 1.

The system according to the invention as shown in FIG. 1 further includes a central computer or processor unit 5 that is adapted for communication with the individual aircraft computers 3 via a radio link 4 established between a radio antenna 16 of the central computer unit. 5 and a respective radio antenna 6 of each aircraft computer 3. The radio link 4 is preferably a bi-directional radio communication link providing bi-directional data transfer or communication between the central computer unit 5 and each selected aircraft computer 3. In this context, each one of the aircraft computers 3 is identified by an individual unambiguous address allocated to this computer, so that the central computer unit 5 can address and communicate with any selected individual one of the aircraft computers 3, or any selected group of the aircraft computers 3, by any conventionally known addressing protocol in the radio communication via the common or shared radio link 4.

Figure 2:
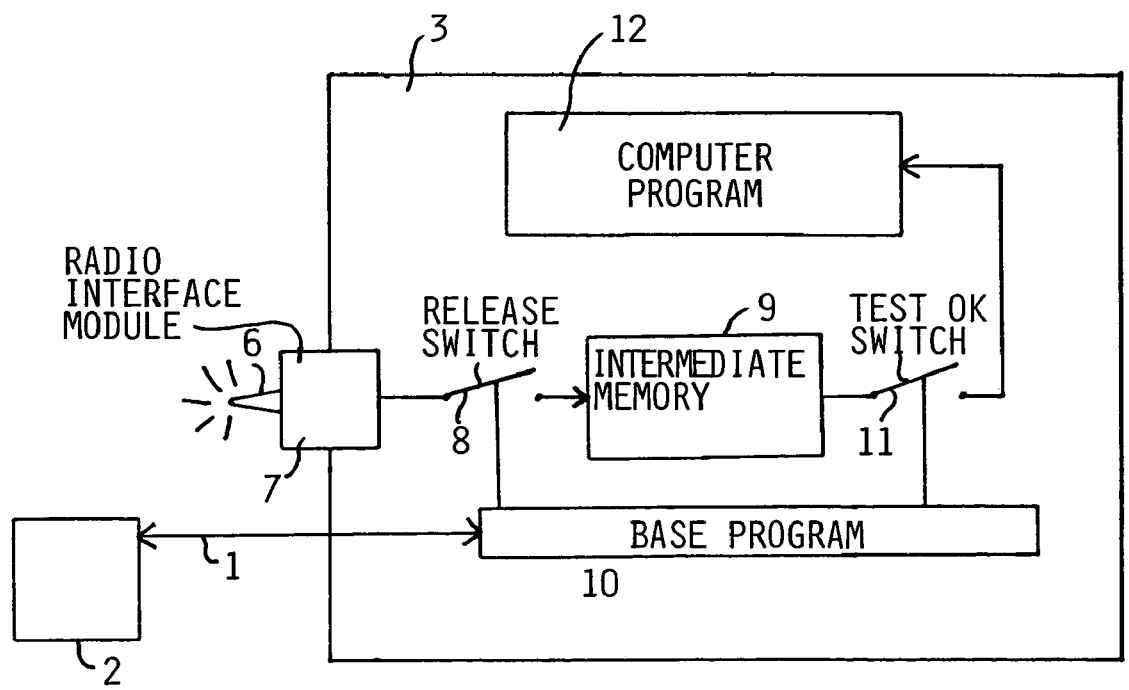
FIG. 2 is a schematic block circuit diagram of the major components of one of the individual aircraft computers.

FIG. 2 schematically shows the primary components making up each individual one of the aircraft computers 3. The radio antenna 6 is connected to a radio interface module 7, by which the computer 3 carries on the (preferably bi-directional) radio communication via the radio link 4 with the central computer unit 5. The communication unit comprising the radio antenna 6 and the radio interface module 7 can be embodied as a permanent incorporated component of the respective aircraft computer 3. Alternatively, this communication unit can be embodied as a separate independent module that is retrofitted or connected as needed to the respective aircraft computer 3 via a plug connection, for example. In this manner, it is a simple matter to retrofit the additional components needed for the present invention onto previously existing aircraft computers installed in existing aircraft.

The individual aircraft computer 3 further includes a release switch 8, an intermediate memory 9 and a test OK or approval switch 11 connected in series with one another between the radio interface module 7 and the main computer program 12 of the computer 3, e.g. the main operating program in active memory or being executed in a processor of the computer 3. The computer 3 further includes a base system program 10, which is also stored and executed in suitable hardware, preferably connected via the aircraft data bus 1 with the central aircraft controller system 2. With this arrangement, the base system program 10 controls the closing of the release switch 8 to release or enable the respective aircraft computer 3 for a radio communication via the radio link 4. Alternatively or additionally, the base system program 10 can enable or disable the radio interface module 7 for controlling the reception or loading of the new program.

Particularly, a new program that is to be loaded into the computer 3 has been stored, prepared, or otherwise provided in the central computer unit 5, and is transmitted from the central computer unit 5 via the radio link 4 to the radio interface module 7 of the computer 3. In this regard, the radio link 4 is carried out at a radio frequency that is not otherwise used for radio transmissions in the normal flight operation of the aircraft, to avoid interference between the radio communication via the radio link 4 and other radio transmissions critical for the operation of the aircraft. Moreover, the radio communication via the radio link 4 to perform the reprogramming may preferably be carried out while the aircraft is on the ground and not in flight operation.

The base system program 10 only closes or enables the release switch 8 (or only enables the radio interface module 7) when the computer 3 is not in its normal operating state, i.e. when the main computer program 12 is not being executed or is not running. Then, once the release switch 8 has been closed, the new program is loaded through the release switch 8 into the intermediate memory 9. Once the new program has been loaded into the intermediate memory 9, it can be tested and validated (e.g. to exclude the possibility of transmission errors or the like) by the base system program 10. Alternatively or additionally, the testing of the new program can be controlled or carried out by the central computer unit 5 or by the aircraft controller system 2 respectively via the radio link 4 or the data bus 1. In any event, once the new program in the intermediate memory 9 has been tested and validated, the base system program 10 releases a positive test signal, which serves to close or enable the test approval switch 11 to connect the intermediate memory 9 with the computer program (and/or its associated hardware) 12. Thereby, the new program in the intermediate memory 9 can be loaded to the main active memory to be executed with or instead of the main computer program 12.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft-based computer system in an aircraft, comprising:
    a physical data bus;
    plural individual computers connected to said data bus;
    a central controller connected to said data bus and adapted to communicate with said individual computers via said data bus; and
    a central computer unit having a radio antenna;
    wherein each one of said individual computers comprises a radio interface module connected to a radio antenna adapted to communicate with said radio antenna of said central computer unit via a radio link therebetween, a main active memory that is connected with said radio interface module via a data path connection and that is adapted to have a program loaded therein for execution, hardware storing and adapted to execute a base program that controls and/or monitors at least one of said radio interface module and said data path connection; and
    wherein said central computer unit contains a new program that is to be loaded into at least one of said individual computers, said central computer unit is adapted to transmit said new program via said radio link to said radio interface module of said one of said individual computers, and said one of said individual computers is adapted to load said new program received by said radio interface module via said data path connection into said main active memory.

2. The aircraft-based computer system according to claim 1, wherein said hardware of each said individual computer is connected to said data bus.

3. The aircraft-based computer system according to claim 1, wherein said data path connection of each said individual computer comprises an intermediate memory.

4. The aircraft-based computer system according to claim 3, wherein said hardware is connected to said intermediate memory in each said individual computer.

5. The aircraft-based computer system according to claim 3, wherein said data path connection of each said individual computer further comprises a release switch that is interposed between said radio interface module and said intermediate memory and that has a control input terminal connected to a control output terminal of said hardware.

6. The aircraft-based computer system according to claim 3, wherein said data path connection of each said individual computer further comprises a test approval switch that is interposed between said intermediate memory and said main active memory and that has a control input terminal connected to a control output terminal of said hardware.

7. The aircraft-based computer system according to claim 1, wherein said radio interface module and said radio antenna of each said individual computer together form a radio communication unit that is physically incorporated into said individual computer.

8. The aircraft-based computer system according to claim 1, wherein said radio interface module and said radio antenna of each said individual computer together form a radio communication unit that is independent from and separably connected via a plug connector to said data path connection.

9. The aircraft-based computer system according to claim 1, wherein said radio antenna of said central computer unit and said radio antenna of each said individual computer respectively are adapted to establish said radio link at a frequency different from all other frequencies of radio transmissions used in flight operation of said aircraft.

10. The aircraft-based computer system according to claim 1, wherein said central computer unit is a portable computer that can be freely carried into and out of said aircraft.

11. The aircraft-based computer system according to claim 1, wherein at least some of said individual computers are permanently installed at physically inaccessible locations in said aircraft.

12. A method of programming individual computers connected to a central system via a physical data bus of a computer system in an aircraft, comprising the steps:
  a) providing a new program in a central computer unit;
  b) radio transmitting said new program via a radio link from said central computer unit to at least one of said individual computers;
  c) loading said new program received via said radio link into a main active memory of said one of said individual computers; and
  d) executing a base system program in said one of said individual computers, and thereby monitoring, controlling and/or supporting said radio transmitting and/or said loading of said new program, and testing said new program received by said one of said individual computers;
wherein said one of said individual computers comprises a communication unit permanently physically incorporated therein, said communication unit comprises a radio interface module and a radio antenna connected thereto, and said communication unit participates in establishing said radio link and receives said new program by said radio transmitting.

13. The method according to claim 12, further comprising executing a normal program in said one of said individual computers, blocking at least one of said radio transmitting and said loading of said new program during said executing of said normal program, and enabling said at least one of said radio transmitting and said loading of said new program only during times when said normal program is not being executed.

14. The method according to claim 12, wherein said testing is carried out exclusively in said at least one of said individual computers exclusively by said executing of said base system program.

15. The method according to claim 12, wherein said testing is carried out under control or involvement of said central system via said data bus.

16. The method according to claim 12, wherein said radio transmitting is carried out at a transmission frequency different from all other frequencies used for other radio transmission in a flight operation of said aircraft.

17. The method according to claim 12, further comprising allocating a respective unambiguous address respectively to each one of said individual computers, selecting said one of said individual computers by selecting said address allocated thereto, and directing said radio transmitting of said new program to said one of said individual computers by identifying said address allocated thereto in said radio transmitting.

18. The method according to claim 12, wherein said radio transmitting via said radio link is carried out with a radio link data transfer rate of over 200 kByte per second, and a bus data transfer rate achieved by said data bus is lower than said radio link data transfer rate.

19. The method according to claim 12, wherein said central computer unit is a portable computer, and further comprising carrying said portable computer into said aircraft in order to carry out at least said step b), and carrying said portable computer out of said aircraft.

* * * * *